US011351922B2

(12) United States Patent
Estrada

(10) Patent No.: US 11,351,922 B2
(45) Date of Patent: Jun. 7, 2022

(54) FOLDABLE BARRIER SYSTEM FOR A FLATBED VEHICLE

(71) Applicant: Steven T. Estrada, Lincoln, AL (US)

(72) Inventor: Steven T. Estrada, Lincoln, AL (US)

(*) Notice: Subject to any disclaimer, the term of this patent is extended or adjusted under 35 U.S.C. 154(b) by 308 days.

(21) Appl. No.: 16/828,876

(22) Filed: Mar. 24, 2020

(65) Prior Publication Data
US 2020/0361391 A1 Nov. 19, 2020

Related U.S. Application Data

(60) Provisional application No. 62/848,574, filed on May 15, 2019.

(51) Int. Cl.
*B60R 5/04* (2006.01)
*B60R 9/08* (2006.01)
*B60R 9/06* (2006.01)

(52) U.S. Cl.
CPC .............. *B60R 5/041* (2013.01); *B60R 5/045* (2013.01); *B60R 9/08* (2013.01); *B60R 9/06* (2013.01)

(58) Field of Classification Search
CPC .......... B60R 5/041; B60R 5/045; B60R 9/08; B60R 9/06; B62D 33/033
USPC ....................................................... 396/37.1
See application file for complete search history.

(56) References Cited

U.S. PATENT DOCUMENTS

| | | | | |
|---|---|---|---|---|
| 4,946,193 A | * | 8/1990 | Oka | B62K 7/04 180/908 |
| 5,429,290 A | | 7/1995 | Greene, Jr. | |
| 6,540,123 B1 | * | 4/2003 | Kmita | B60P 3/40 224/403 |
| 7,093,872 B2 | * | 8/2006 | Stanfield | B60R 9/00 180/908 |
| 8,167,351 B2 | | 5/2012 | Plowman | |
| 2005/0264048 A1 | | 12/2005 | Collins | |
| 2007/0057526 A1 | | 3/2007 | Bigelow et al. | |
| 2008/0111390 A1 | * | 5/2008 | Smith | B62D 33/0273 296/50 |
| 2009/0184536 A1 | * | 7/2009 | Kubota | B62D 25/10 296/65.09 |
| 2013/0049395 A1 | * | 2/2013 | Poirier | B60R 5/041 296/37.6 |
| 2022/0073012 A1 | * | 3/2022 | Tressel | B60R 11/06 |

* cited by examiner

*Primary Examiner* — Pinel E Romain
(74) *Attorney, Agent, or Firm* — Charles Runyan; Runyan Law

(57) ABSTRACT

A foldable barrier system; the foldable barrier system includes a three-sided foldable containment assembly defined by a first-section, a second-section, and a third-section hingedly connected in a respective series. The three-sided foldable containment assembly is configured to be mounted to a perimeter of a flatbed section of a vehicle and define an inner volume to contain items stored within the inner volume upon the flatbed section of the vehicle. The second-section is in alignment with a rear portion of the flatbed section, the first-section is in alignment with a right-side of the flatbed section, and the third-section is in alignment with a left-side of the flatbed section.

20 Claims, 5 Drawing Sheets

FOLDABLE BARRIER SYSTEM FOR A FLATBED VEHICLE

CROSS-REFERENCE TO RELATED APPLICATION(S)

The present application is related to and claims priority to U.S. Provisional Patent Application No. 62/848,574 filed May 15, 2019, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

Technical Field

The present invention relates generally to the field of vehicle accessories of existing art and more specifically relates to barrier systems for containing items within an area of a vehicle.

Related Art

Many people transport items, whether coolers, work tools, floats, towels, bags, backpacks, and more, on the load floor of a golf cart. Unfortunately, there is nothing to keep these items from sliding and falling off the sides of the floor, particularly when driving over bumps or on uneven terrain. Not only can this cause damage, but people may not even realize the items fell off until it's too late and they're unable to find them. A suitable solution is desired.

U.S. Pat. No. 8,167,351 to Donald J. Plowman relates to a seat/flatbed/drop-in-container assembly for cart. The described seat/flatbed/drop-in-container assembly for cart includes a framework extending from and supported by the cart, including at least one support member, and defining a volume of space interiorly of the support member and a remaining portion of the framework. A seat is supported by the framework within the volume of space and adapted to extend to define a flatbed supported by the framework within the volume of space. A container is adapted to be dropped in the volume of space and supported upon the flatbed. To secure the container to the framework upon the flatbed, the support member extends through an aperture disposed completely through the container and/or is interferingly fitted between a body of the container and lip of a rim thereof. Alternatively, to secure the container upon the flatbed, the seat includes a seat back, and the container defines a flange that holds the seat back.

SUMMARY OF THE INVENTION

In view of the foregoing disadvantages inherent in the known vehicle accessory art, the present disclosure provides a novel foldable barrier system. The general purpose of the present disclosure, which will be described subsequently in greater detail, is to provide a foldable barrier system.

A foldable barrier system is disclosed herein. The foldable barrier system includes a three-sided foldable containment assembly including a first-section, a second-section, and a third-section being hingedly connected in a respective series. The three-sided foldable containment assembly is configured to be mounted to a perimeter of a flatbed section of a vehicle and define an inner volume to contain items stored within the inner volume upon the flatbed section of the vehicle. The first-section and the third-section are connected to the second-section at opposing sides via hinges. The second-section is in alignment with a rear portion of the flatbed section, the first-section is in alignment with a right-side of the flatbed section, and the third-section is in alignment with a left-side of the flatbed section. The first-section, the second-section, and the third-section of the three-sided foldable containment assembly are connectable to the flatbed section of the vehicle via suitable fasteners.

The three-sided foldable containment assembly may be used with various vehicles including but not limited to a golf cart, a utility vehicle, or an all-terrain vehicle. The present invention allows people to transport items on the back of a golf cart with ease, convenience, and safety. It prevents items from sliding or falling off the cart, especially when going over bumps. It folds down when not in use and saves people a considerable amount of time and frustration. Further it effectively avoids damage to items.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a foldable barrier system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a vehicle accessory and more particularly to a foldable barrier system as used to improve the containment of items stored on a flatbed rear section of a vehicle including a utility vehicle or golf cart.

Generally, foldable barrier system provides a safe and convenient way to contain items on a golf cart, utility vehicle or ATV load floor. This innovative product features a pre-assembled, three-sided folding fence for golf cart load floors. The fence can have welded hinges and can be mounted to golf carts with fastening screws. Simple hinges can include a slit hose and cable ties at the hinge point for outer swing joints. All points of mount can be screwed or clipped. If clipped, the fence can be removed as needed. Additionally, the height of the fence can vary to accommodate user needs and can tuck under the seat when folded closed for passengers. The exact specifications may vary upon manufacturing.

Referring now more specifically to the drawings by numerals of reference, there is shown in FIGS. 1-5, various views of a foldable barrier system 100.

Figure 1:
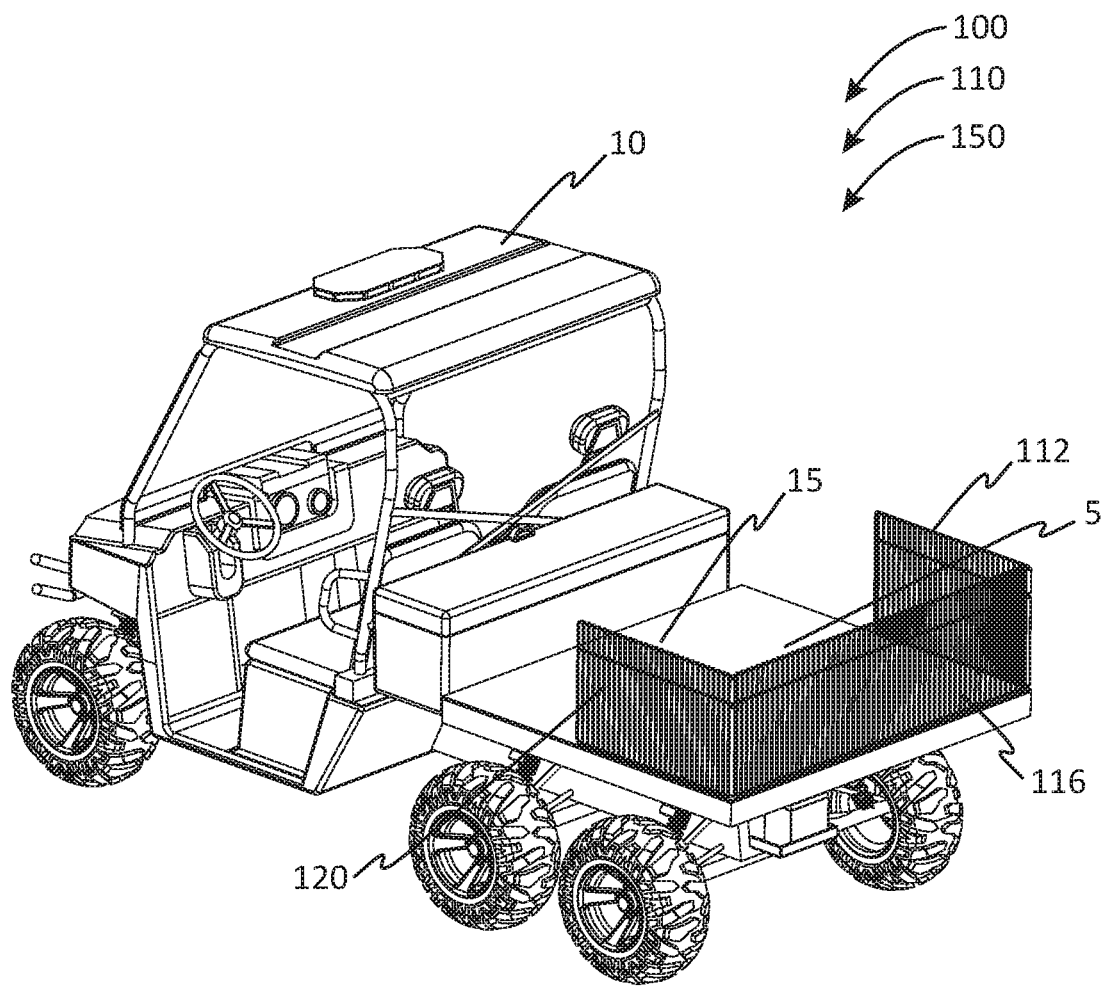
FIG. 1 is a perspective view of the foldable barrier system during an 'in-use' condition, according to an embodiment of the disclosure.

FIG. 1 shows a foldable barrier system 100 during an 'in-use' condition 150, according to an embodiment of the present disclosure. As illustrated, the foldable barrier system 100 may include a three-sided foldable containment assembly 110 including a first-section 112, a second-section 116, and a third-section 120 being hingedly connected in a respective series. The three-sided foldable containment assembly 110 is configured to be mounted to a perimeter of a flatbed section 5 of a vehicle 10 and define an inner volume to contain items stored within the inner volume upon the flatbed section 5 of the vehicle 10. The three-sided foldable containment assembly 110 may be used with various vehicles 10 including but not limited to a golf cart, a utility vehicle, or an all-terrain vehicle.

Figure 2:
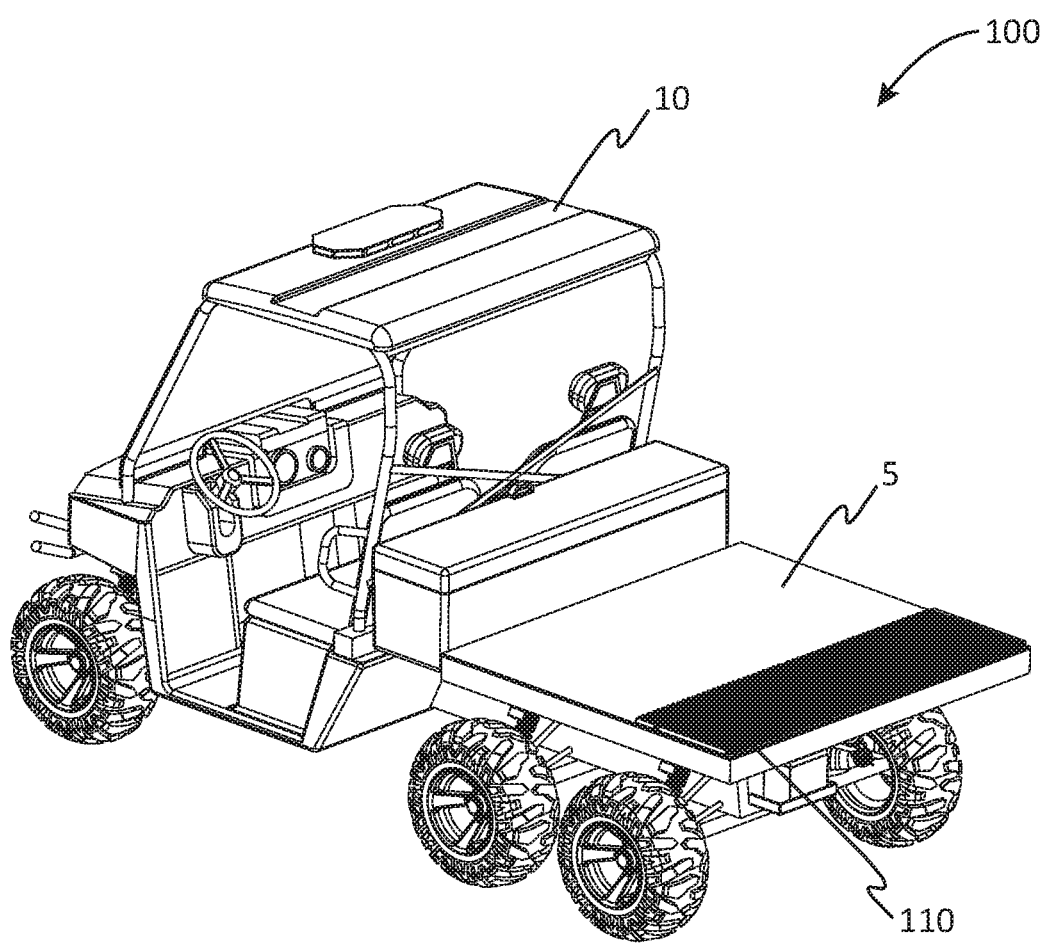
FIG. 2 is a perspective view of the foldable barrier system of FIG. 1, according to an embodiment of the present disclosure.

FIG. 2 shows the foldable barrier system 100 of FIG. 1, according to an embodiment of the present disclosure. As above, the foldable barrier system 100 may include the three-sided foldable containment assembly 110 including the first-section, the second-section 116, and the third-section 120 for installing on a flatbed section 5 of a golf cart or other vehicle 10 to contain items. The second-section 116 is in alignment with a rear portion of the flatbed section 5, the first-section 112 is in alignment with a right-side of the flatbed section 5, and the third-section 120 is in alignment with a left-side of the flatbed section 5. The hosting vehicle 10 may include rails at the right-side of the flatbed section 5 and the left-side of the flatbed section 5. In certain embodiments the three-sided foldable containment assembly 110 is removably coupled to the vehicle 10 via fasteners 130. In such embodiment, the fasteners 130 include suitable fasteners 130 including clips or the like allowing for removal and installation of the device. In other alternative embodiments, the three-sided foldable containment assembly 110 may be semi-permanently attachable to the vehicle 10 via fasteners 130. In such embodiment, the fasteners 130 include semi-permanent fasteners such as screws. The first-section 112, the second-section 116, and the third-section 120 of the three-sided foldable containment assembly 110 are connectable to the top surface 15 of the flatbed section 5 of the vehicle 10 via the suitable fasteners.

Figure 3:
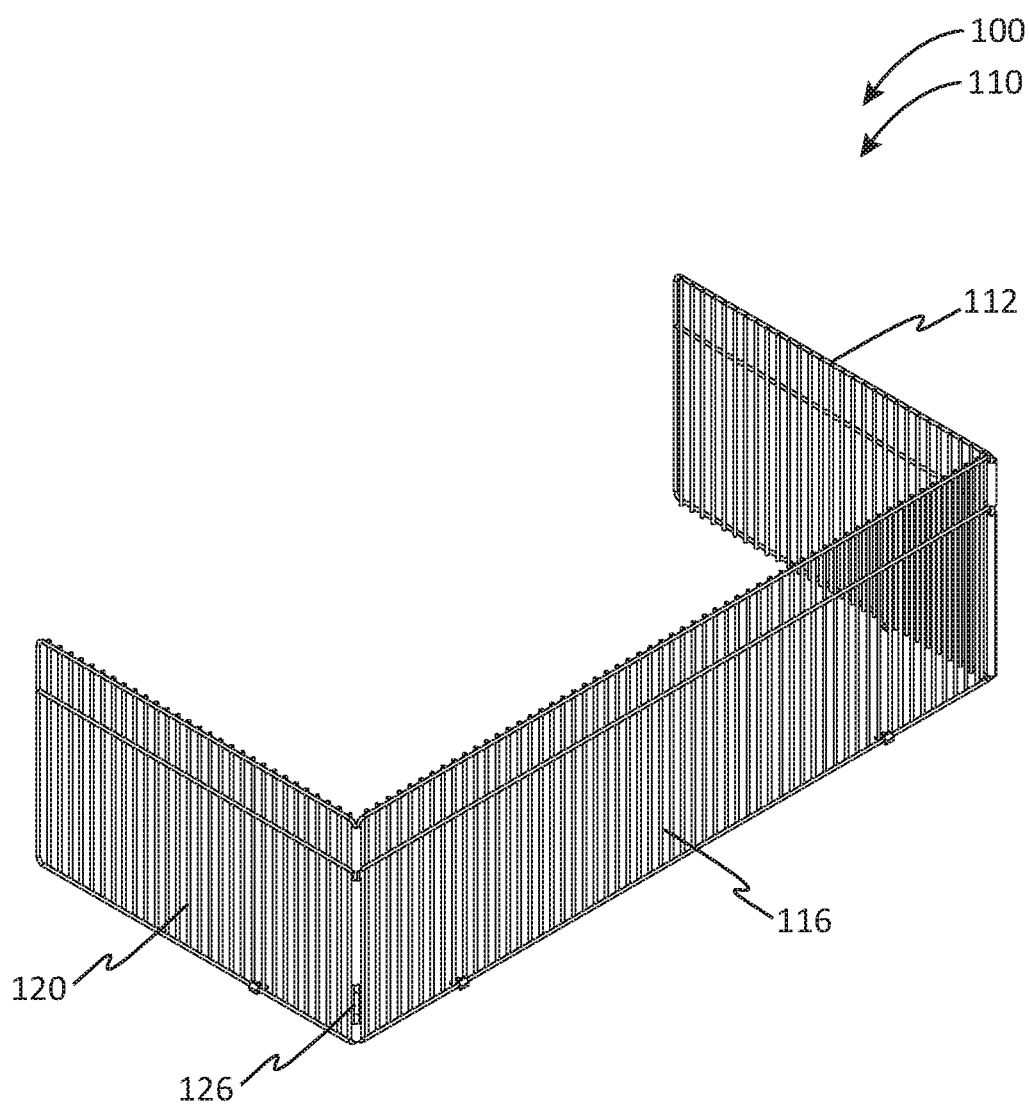
FIG. 3 is a perspective view of the foldable barrier system of FIG. 1, according to an embodiment of the present disclosure.

FIG. 3 is a perspective view of the foldable barrier system 100 of FIG. 1, according to an embodiment of the present disclosure. The three-sided foldable containment assembly 110 comprises the first-section 112, the second-section 116, and the third-section 120. The first-section 112 and the third-section 120 are connected to the second-section 116 at opposing sides via hinges 126. In certain embodiments, the hinges 126 are concealed by a sleeve 128. In a preferred embodiment, the first-section 112, the second-section 116, and the third-section 120 comprise a solid or non-solid fence-like material. The fence-like material may comprise metal or other suitable materials.

Figure 4:
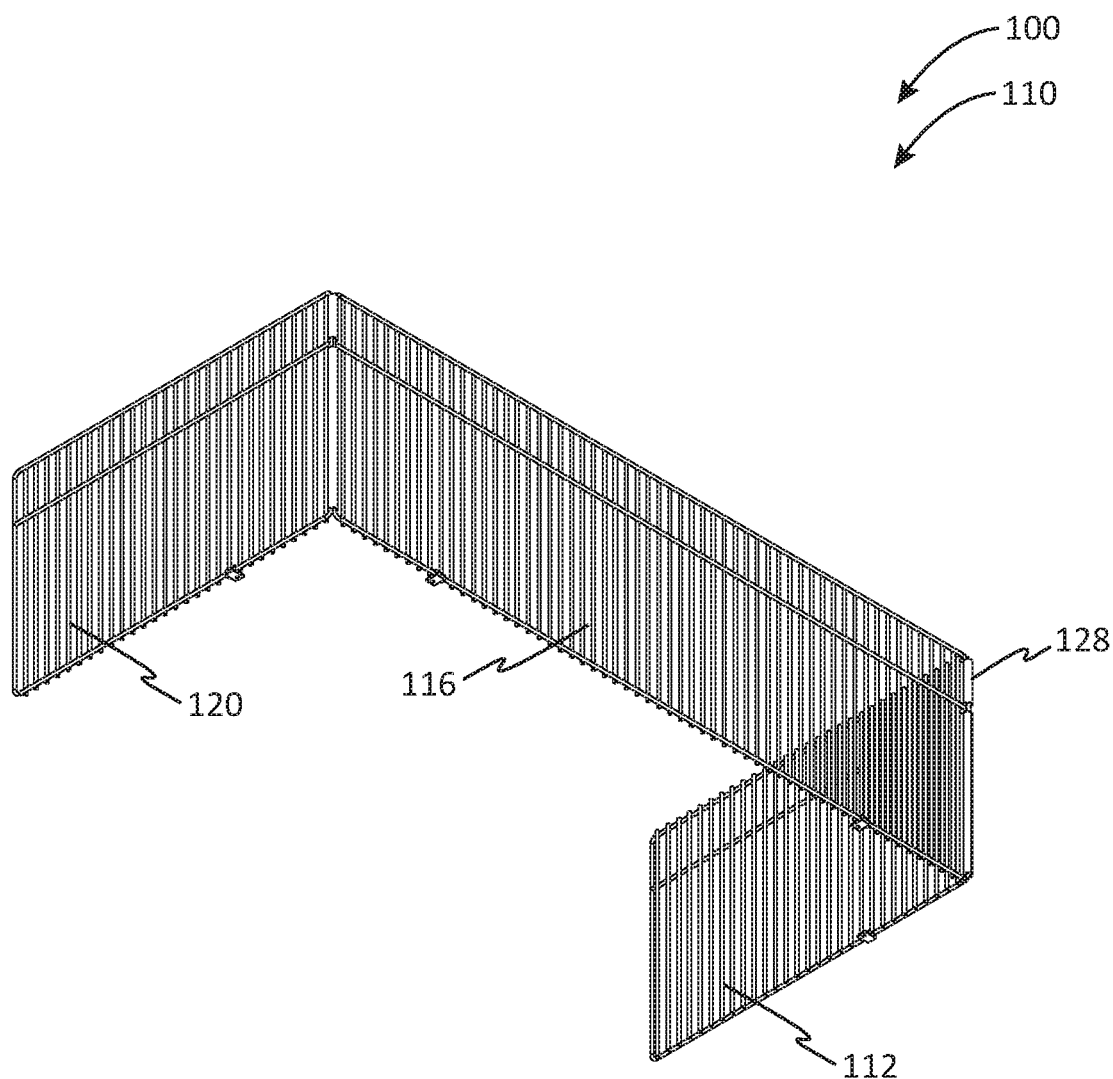
FIG. 4 is a perspective view of the foldable barrier system of FIG. 1, according to an embodiment of the present disclosure.

FIG. 4 is a perspective view of the foldable barrier system 100 of FIG. 1, according to an embodiment of the present disclosure. The first-section 112, the second-section 116, and the third-section 120 are connectable to the top surface 15 of the flatbed section 5 of the vehicle 10. The first-section 112, the second-section 116, and the third-section 120 are perpendicular the flatbed section 5 of the vehicle 10 during an erected in-use condition. The three-sided foldable containment assembly 110 is foldable to lie flush with a top surface 15 of the flatbed section 5 of the vehicle 10 during a non-use condition. Alternatively, the three-sided foldable containment assembly 110 may be removed and stored under a seat or other location between uses. In golf cart application, the second-section 116 comprises a length of approximately 38.5 inches to extend along an inner rear portion of a flatbed section 5. The three-sided foldable containment assembly 110 may include various dimensions to accommodate a plurality of vehicles 10 including golf carts, ATVs/UTVs, and industrial utility vehicles.

Figure 5:
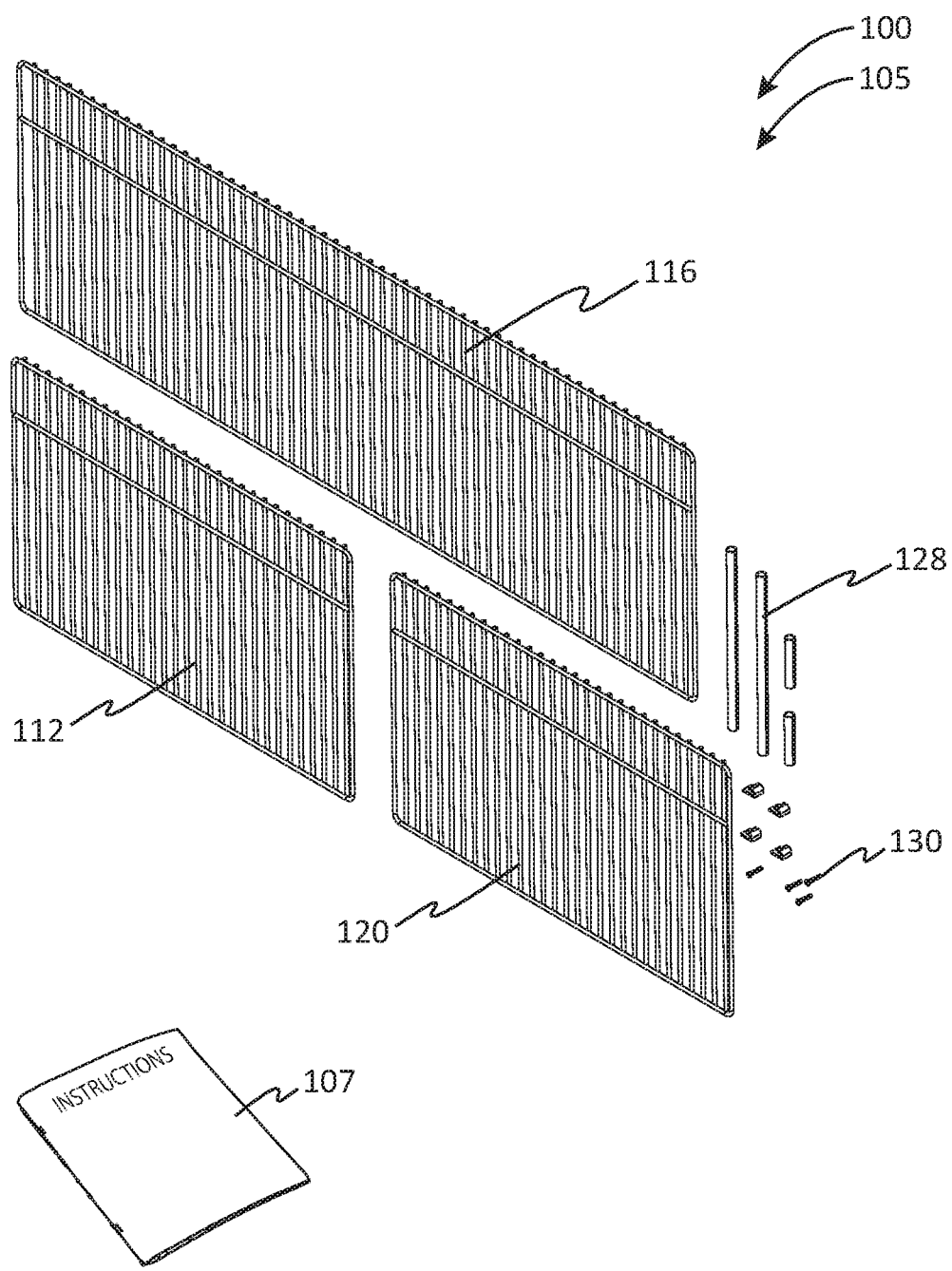
FIG. 5 is a perspective view of the foldable barrier system of FIG. 1, according to an embodiment of the present disclosure.

According to one embodiment, the foldable barrier system 100 may be arranged as a kit 105, as shown in FIG. 5. In particular, the foldable barrier system 100 may further include various fasteners and a set of instructions 107. The instructions 107 may detail functional relationships in relation to the structure of the foldable barrier system 100 such that the foldable barrier system 100 can be used, maintained, or the like, in a preferred manner.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A foldable barrier system, the foldable barrier system comprising:
    a three-sided foldable containment assembly including a first-section, a second-section, and a third-section being hingedly connected in a respective series;
    wherein said three-sided foldable containment assembly is configured to be mounted to a perimeter of a flatbed section of a vehicle defining an inner volume to contain items stored within said inner volume upon said flatbed section of said vehicle.

2. The foldable barrier system of claim 1, wherein said vehicle is selected from a group consisting of a golf cart, a utility vehicle, and an all-terrain vehicle.

3. The foldable barrier system of claim 1, wherein said second-section is in alignment with a rear portion of said flatbed section, said first-section is in alignment with a right-side of said flatbed section, and said third-section is in alignment with a left-side of said flatbed section.

4. The foldable barrier system of claim 1, wherein said three-sided foldable containment assembly is removably coupled to said vehicle via fasteners.

5. The foldable barrier system of claim 1, wherein said three-sided foldable containment assembly is semi-permanently attachable to said vehicle via fasteners.

6. The foldable barrier system of claim 4, wherein said fasteners comprise clips.

7. The foldable barrier system of claim 5, wherein said fasteners comprise screws.

8. The foldable barrier system of claim 1, wherein said first-section and said third-section are connected to said second-section at opposing sides via hinges.

9. The foldable barrier system of claim 8, wherein said hinges are concealed by a sleeve.

10. The foldable barrier system of claim 1, wherein said first-section, said second-section, and said third-section comprise a fence-like material.

11. The foldable barrier system of claim 10, wherein said fence-like material is non-solid.

12. The foldable barrier system of claim 10, wherein said fence-like material is solid.

13. The foldable barrier system of claim 10, wherein said fence-like material comprises metal.

14. The foldable barrier system of claim 1, wherein said three-sided foldable containment assembly is foldable to lie flush with a top surface of said flatbed section of said vehicle during a non-use condition.

15. The foldable barrier system of claim 14, wherein said first-section, said second-section, and said third-section are perpendicular said flatbed section of said vehicle during an erected in-use condition.

16. The foldable barrier system of claim 1, wherein said second-section comprises a length of approximately 38.5 inches.

17. The foldable barrier system of claim 14, wherein said first-section, said second-section, and said third-section are connectable to said top surface of said flatbed section of said vehicle.

18. The foldable barrier system of claim 1, wherein said vehicle comprises rails at said right-side of said flatbed section and said left-side of said flatbed section.

19. A foldable barrier system, the foldable barrier system comprising:

a three-sided foldable containment assembly including a first-section, a second-section, and a third-section being hingedly connected in a respective series;

wherein said three-sided foldable containment assembly is configured to be mounted to a perimeter of a flatbed section of a vehicle defining an inner volume to contain items stored within said inner volume upon said flatbed section of said vehicle;

wherein said vehicle is selected from a group consisting of a golf cart, a utility vehicle, and an all-terrain vehicle;

wherein said second-section is in alignment with a rear portion of said flatbed section, said first-section is in alignment with a right-side of said flatbed section, and said third-section is in alignment with a left-side of said flatbed section;

wherein said three-sided foldable containment assembly is removably coupled to said vehicle via fasteners;

wherein said first-section, said second-section, and said third-section are connectable to said top surface of said flatbed section of said vehicle;

wherein said vehicle comprises rails at said right-side of said flatbed section and said left-side of said flatbed section;

wherein said first-section and said third-section are connected to said second-section at opposing sides via hinges;

wherein said hinges are concealed by a sleeve;

wherein said first-section, said second-section, and said third-section comprise a fence-like material;

wherein said fence-like material is non-solid;

wherein said fence-like material comprises metal;

wherein said three-sided foldable containment assembly is foldable to lie flush with a top surface of said flatbed section of said vehicle during a non-use condition; and wherein said first-section, said second-section, and said third-section are perpendicular said flatbed section of said vehicle during an erected in-use condition.

20. The foldable barrier system of claim 19, further comprising set of instructions; and wherein the foldable barrier system is arranged as a kit.

* * * * *